US007134595B2

(12) United States Patent
Clark et al.

(10) Patent No.: US 7,134,595 B2
(45) Date of Patent: Nov. 14, 2006

(54) PEOPLE COUNTING SYSTEM FOR FACILITY-WIDE REPORTING

(75) Inventors: John Jay Clark, Boynton Beach, FL (US); Scott A. Tribbey, Coconut Creek, FL (US); Joseph P. Cossette, Fort Lauderdale, FL (US); David B. Fallin, Coral Springs, FL (US)

(73) Assignee: Sensormatic Electronics Corporation, Boca Raton, FL (US)

( * ) Notice: Subject to any disclaimer, the term of this patent is extended or adjusted under 35 U.S.C. 154(b) by 136 days.

(21) Appl. No.: 10/828,383

(22) Filed: Apr. 20, 2004

(65) Prior Publication Data

US 2004/0238628 A1 Dec. 2, 2004

Related U.S. Application Data

(60) Provisional application No. 60/474,376, filed on May 30, 2003.

(51) Int. Cl.
*G06K 5/00* (2006.01)

(52) U.S. Cl. ........................................ 235/382

(58) Field of Classification Search ................ 235/382, 235/384; 340/5.2
See application file for complete search history.

(56) References Cited

U.S. PATENT DOCUMENTS 5,514,857 A * 5/1996 Corless ....................... 235/384
5,682,142 A 10/1997 Loosmore et al.
2003/0102956 A1* 6/2003 McManus et al. ........... 340/5.2
2004/0188185 A1 9/2004 Pieper

FOREIGN PATENT DOCUMENTS

| | | | |
|---|---|---|---|
| DE | 4220508 | A1 | 12/1993 |
| DE | 4425567 | A1 | 2/1996 |
| DE | 20017009 | U1 | 1/2001 |
| DE | 10029784 | A1 | 11/2001 |
| DE | 10117939 | A1 | 10/2002 |
| DE | 10146459 | A1 | 4/2003 |
| WO | WO 89/04031 | A | 5/1989 |
| WO | WO 01/75809 | A | 10/2001 |

* cited by examiner

*Primary Examiner*—Jared J. Fureman
*Assistant Examiner*—Kristy A. Haupt
(74) *Attorney, Agent, or Firm*—Alan M. Weisberg; Christopher & Weisberg, P.A.

(57) ABSTRACT

A people counting system including: a first people counting data collection unit configured to store a first set of people count data; and a second people counting data collection unit configured to store a second set of people count data. The first people counting data collection unit is configured for bi-directional communication with the second people counting data collection unit to facilitate access of people count data from either collection unit. A method monitoring a count of people traversing at least first and second passageways is also provided.

12 Claims, 2 Drawing Sheets

PEOPLE COUNTING SYSTEM FOR FACILITY-WIDE REPORTING

CROSS REFERENCE TO RELATED APPLICATIONS

The present application claims the benefit of the filing date of U.S. Provisional Application Ser. No. 60/474,376, filed May 30, 2003, entitled "People Counting System For Facility-Wide Reporting," the entire teachings of which are incorporated herein by reference.

FIELD OF THE INVENTION

The present invention relates to people counting systems and in particular to a people counting system with a plurality of people counting data collection units having automatic notification and discovery of other units in the system.

BACKGROUND

A variety of people counting systems are well-known and commercially available. In general, people counting systems provide a count of people crossing a particular passageway and, in some cases, also provide an indication of the direction of travel of people crossing the passageway. These systems may be configured to include one more sensors adjacent each passageway to be monitored and associated people counting data collection units for receiving people count information from the sensors.

The sensors may utilize a variety of people detection technologies such as providing a beam, e.g., an infrared beam, across the passageway to be monitored. As people enter or exit the passageway, the beam is temporarily interrupted. The beam sensor detects this interruption and the associated data collection unit stores count data for each sensor.

Each people counting data collection unit may include a user interface whereby a user can access, analyze, and manipulate people count data associated therewith. Unfortunately, however, the people counting data collection units have not been configured to communicate with one another. Therefore, a user cannot access or analyze people count data from all people counting data collection units installed at a particular location by simply accessing only one of the people counting data collection units.

Accordingly, there is a need for a people counting system wherein communication of data between data collection units is facilitated.

SUMMARY OF THE INVENTION

According to one aspect of the invention there is provided a people counting system including: a first people counting data collection unit configured to store a first set of people count data; and a second people counting data collection unit configured to store a second set of people count data. The first people counting data collection unit is configured for bi-directional communication with the second people counting data collection unit to facilitate access of people count data from either collection unit.

According to another aspect of the invention, there is provided a method monitoring a count of people traversing at least first and second passageways including: providing a first people counting data collection unit configured to store a first set of people count data representative of people traversing the first passageway; providing a second people counting data collection unit configured to store a second set of people count data representative of people traversing the second passageway, and establishing bi-directional communication between the first people counting data collection unit and the second people counting data collection unit, whereby the first set of people count data is accessible by the second people count data collection unit and the second set of people count data is accessible by the first people count data collection unit.

BRIEF DESCRIPTION OF THE DRAWINGS

For a better understanding of the present invention, together with other objects, features and advantages, reference should be made to the following detailed description which should be read in conjunction with the following figures wherein like numerals represent like parts.

DETAILED DESCRIPTION

For simplicity and ease of explanation, the present invention will be described herein in connection with various exemplary embodiments thereof. Those skilled in the art will recognize, however, that the features and advantages of the present invention may be implemented in a variety of configurations. It is to be understood, therefore, that the embodiments described herein are presented by way of illustration, not of limitation.

Figure 1:
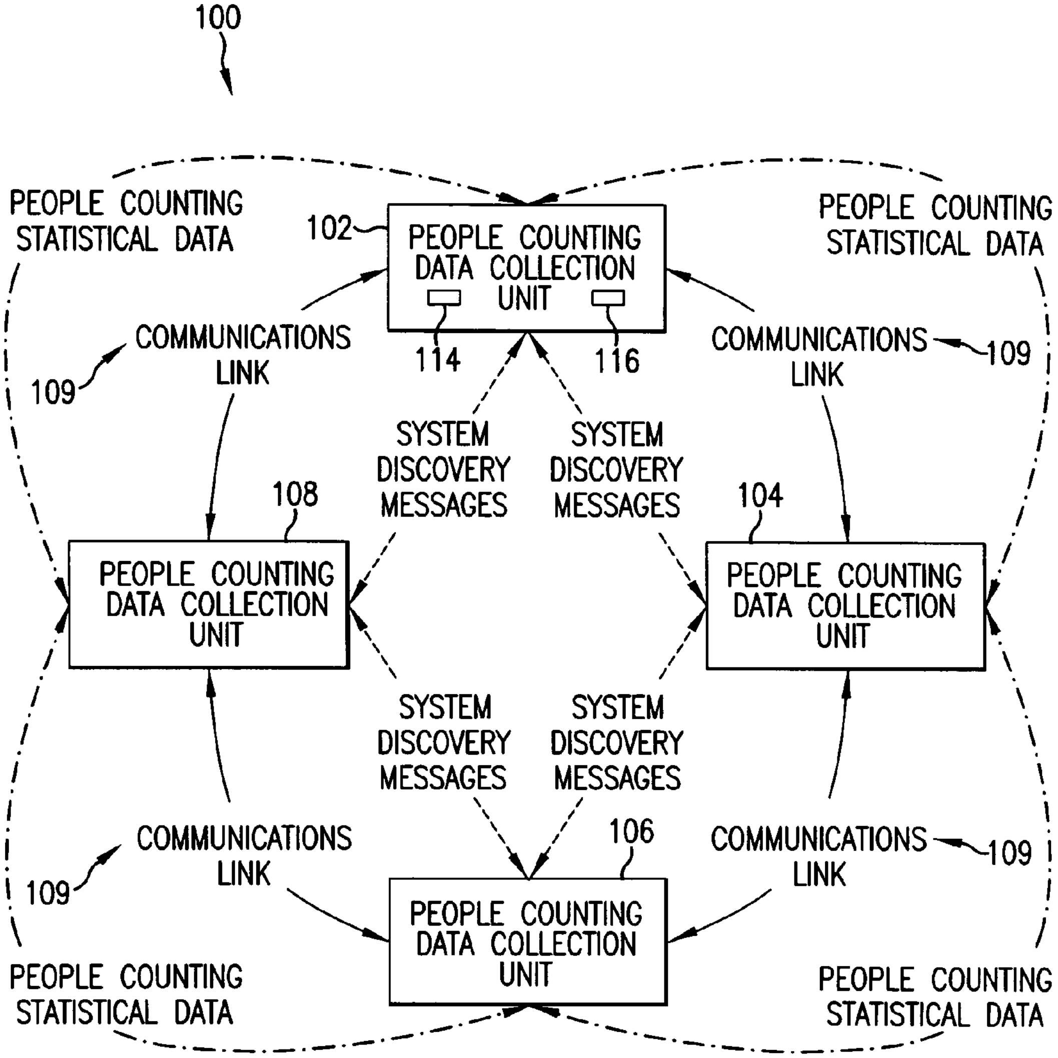
FIG. 1 is block diagram of an exemplary people counting system having a plurality of people counting data collection units consistent with the present invention.

Turning now to FIG. 1, a block diagram of a people counting system 100 consistent with the invention is illustrated. In general, the illustrated exemplary people counting system 100 includes a plurality of people counting data collection units 102, 104, 106, 108 (hereinafter "units") configured to communicate with each other as further detailed herein. As such, one unit can, among other things, collect, analyze, and present correlated data from other units in the system 100.

The people counting system 100 includes sensors (not shown) that provide associated people count data signals to each unit 102, 104, 106, 108. The sensors may be any variety of sensors known in the art. For instance, one type of sensor may provide a beam (e.g., an infrared beam) across a monitored passageway such that as people enter and exit the passageway, the beam is temporarily interrupted. Another type of sensor may be a video camera.

Regardless of the sensor type, each sensor communicates associated people count data to one of the units 102, 104, 106, 108 through any of a variety of communication means. Each unit 102, 104, 106, 108 may accept people count data signals from one or more sensors. Although four units 102, 104, 106, 108 are illustrated in the exemplary people counting system 100, those skilled in the art will recognize that any number of units may be utilized in a system 100 consistent with the invention.

Advantageously, the units 102, 104, 106, 108 may be configured to communicate with each other via a communications link 109 using any variety of communication protocols to establish bi-directional communication between the units 102, 104, 106, 108. The communications link 109 may be any variety of communication links known in the art such as network cable or a wireless communication configuration. The communication protocol can include any of a variety of protocols known in the art.

For example, the communication protocol may be a datagram or session-oriented communication protocol if modern computerized networking technologies are utilized. If older interfacing technologies are utilized, the communication protocol may be a multi-drop RS-242 configuration. Those skilled in the art will recognize that each unit 102, 104, 106, 108 would be equipped with appropriate hardware and/or software to enable communication between each unit via the communications link 109 depending on the specific communication link and communication protocol utilized.

Establishment of the communication link 109 between units 102, 104, 106, 108 enables each unit to advertise its presence to other units so that other units will be aware of the existence of that unit. Each unit may be configured to advertise its presence to the other units at certain time intervals by sending discovery messages. For instance, a unit may be configured to advertise its presence immediately upon power-up of the unit for a certain first advertising time period. Thereafter, the same unit may advertise again after the expiration of some time interval following the first advertising period, e.g., a day. This enables each unit 102, 104, 106, 108 to discover each other unit connected on the link 109, and allows a late arriving unit to learn of the other units. Such advertising may take place via the communication link 109 using a message-based communication protocol.

Once each unit is aware of the other units in the system 100, each unit maintains or has access to a list of all the advertised units 102, 104, 106, 108 in the system. The list may be stored in any of a variety of machine readable storage media which may be located within each unit 102, 104, 106, 108 or within an associated network, e.g., a point of sale network that communicates with the units.

In addition to maintaining a list of advertised units, a unit can automatically, or via instruction from a user, access people counting statistical data from any of the other units in the system 100. As such, one unit may receive current people counting statistical data from other units of the system 100. Each unit has appropriate hardware and/or software to establish and connection with the other units of the system. In addition, each unit may include appropriate hardware and/or software to gather, store, analyze, and present the people counting statistical data from the other units.

It will be appreciated that the functionality described for the units 102, 104, 106, 108 of the system 100 may be implemented using hardware, software, or a combination of hardware and software, and well-known signal processing techniques. If implemented in software, a processor, e.g., processor 114, and machine-readable medium, e.g., medium 116 of unit 102 is required. The processor can be any type of processor capable of providing the speed and functionality required by the embodiments of the invention. For example, the processor could be a processor from the Pentium® family of processors made by Intel Corporation, or the family of processors made by Motorola. The processor may be located in a unit, e.g., processor 114 of unit 102, or may be located elsewhere but yet accessible by the unit.

Machine-readable media include any media capable of storing instructions adapted to be executed by the processor. Some examples of such media include, but are not limited to, read-only memory (ROM), random-access memory (RAM), programmable ROM (PROM), erasable programmable ROM (EPROM), electronically erasable programmable ROM (EEPROM), dynamic RAM (DRAM), magnetic disk (e.g. floppy disk and hard drive), optical disk (e.g. CD-ROM), and any other device that can store digital information. In one embodiment, the instructions are stored on the medium in a compressed and/or encrypted format.

As used herein, the phrase "adapted to be executed by a processor" is meant to encompass instructions stored in a compressed and/or encrypted format, as well as instructions that have to be compiled or installed by an installer before being executed by the processor. Further, the processor 114 and machine-readable medium 116 are illustrated as part of a unit 102, but may be part of a larger system accessible by the unit. In addition, the processor and machine readable medium may contain various combinations of machine-readable storage devices through various I/O controllers, which are accessible by the processor and which are capable of storing a combination of computer program instructions and data.

Figure 2:
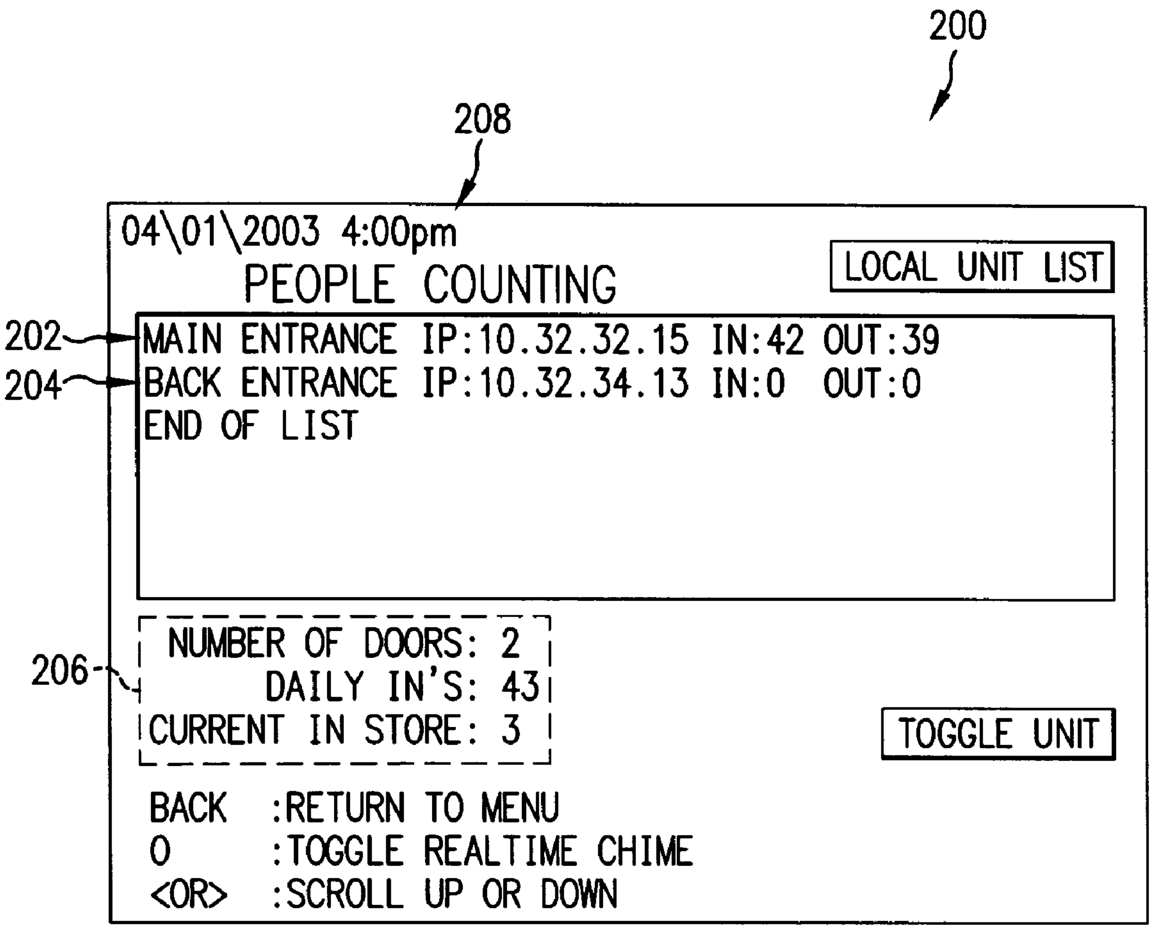
FIG. 2 is an exemplary display screen of one of the people data collection units of FIG. 1.

Turning to FIG. 2, an exemplary display screen 200 that may be displayed on an output video screen of a data collection unit in a system consistent with the invention is illustrated. The display screen 200 includes people counting data from the various passageways, e.g., from a main entrance 202 and a back entrance 204. In the illustrated exemplary embodiment, the particular sensor utilized as the main and back entrance is capable of indicating the direction of travel of people. Accordingly, the number of people IN and OUT for each passageway is also displayed on the exemplary screen 200, e.g., 42 IN and 39 OUT of the main entrance. The date and time 208 may also be displayed such that a user knows the people counting data from each entrance is current through that particular date and time.

In addition, a summary display 206 of the people counting data from the various units may be provided in any variety of formats. The exemplary summary display 206 illustrates the number of doors, the daily In's, and the current number of people in the store. As such, a user of the system 100 can obtain a quick snapshot of people counting data from all the units 102, 104, 106, 108 in the system simply by accessing the display associated with one unit.

There is thus provided a people counting data collection unit capable of bi-directional communication with another people counting data collection unit. As such, people counting statistical data can be exchanged among such units for analysis and presentation of all people counting statistical data from one unit. The embodiments that have been described herein, however, are but some of the several which utilize this invention and are set forth here by way of illustration but not of limitation. For example, various features and advantages described herein may be combined or used separately. It is obvious that many other embodiments, which will be readily apparent to those skilled in the art, may be made without departing materially from the spirit and scope of the invention.

What is claimed is:

1. A method monitoring a count of people traversing at least first and second passageways, said method comprising:

providing a first people counting data collection unit configured to store a first set of people count data representative of people traversing said first passageway;

providing a second people counting data collection unit configured to store a second set of people count data representative of people traversing said second passageway, establishing bi-directional communication between said first people counting data collection unit and said second people counting data collection unit, whereby said first set of people count data is accessible by said second people count data collection unit and said second set of people count data is accessible by said first people count data collection unit; and analyzing said second set of people count data and said first set of people count data using one of said first people counting data collection unit and said second people counting data collection unit.

2. The method of claim 1, said method further comprising advertising presence of said first people counting data collection unit to said second people counting data collection unit.

3. The method of claim 2, said method further comprising advertising presence of said second people counting data collection unit to said first people counting data collection unit.

4. The method of claim 1, said method further comprising periodically advertising presence of said first people counting data collection unit to said second people counting data collection unit.

5. A machine readable medium whose contents cause a first people counting data collection unit to perform a method of communicating with at least a second people counting data collection unit, said method comprising:

advertising a presence of said first people counting data collection unit to at least said second people counting data collection unit;

receiving a second set of people count data from said second people counting data collection unit; and analyzing said second set of people count data and a first set of people count data from said first people counting data collection unit.

6. The machine readable medium of claim 5, wherein said advertising is performed periodically.

7. The machine readable medium of claim 5, wherein said method further comprises:

providing an output signal in response to said analyzing step.

8. The machine readable medium of claim 7, wherein said method further comprises:

displaying said second set of people count data and said first set of people count data.

9. A people counting data collection unit comprising a processor, a display screen displaying people counting data and a machine readable medium having contents that cause said people counting data collection unit to perform a method of communicating with at least a second people counting data collection unit, said method comprising:

advertising a presence of said first people counting data collection unit to at least said second people counting data collection unit;

receiving a second set of people count data from said second people counting data collection unit; and analyzing said second set of people count data and a first set of people count data from said first people counting data collection unit.

10. A people counting data collection unit comprising a processor and a machine readable medium having contents that cause said people counting data collection unit to perform a method of communicating with at least a second people counting data collection unit, said method comprising:

advertising a presence of said first people counting data collection unit to at least said second people counting data collection unit;

receiving a second set of people count data from said second people counting data collection unit; and analyzing said second set of people count data and a first set of people count data from said first people counting data collection unit.

11. The people counting data collection unit of claim 10, wherein said method further comprises:

providing an output signal in response to said analyzing step.

12. The people counting data collection unit of claim 11, wherein said method further comprises:

displaying said second set of people count data and said first set of people count data on a display screen.

* * * * *